US012612098B2

(12) United States Patent
Do et al.

(10) Patent No.: US 12,612,098 B2
(45) Date of Patent: Apr. 28, 2026

(54) RWA SYSTEM CONTROL APPARATUS AND METHOD

(71) Applicant: HYUNDAI MOBIS CO., LTD., Seoul (KR)

(72) Inventors: Young Hwan Do, Yongin-si (KR); Jeong Min Lee, Yongin-si (KR); Hyung Ju Kwon, Yongin-si (KR); Hee Kyu Lim, Yongin-si (KR); Hyun Su Kim, Yongin-si (KR); Eui Nam Jeong, Yongin-si (KR); In Hyuk Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 32 days.

(21) Appl. No.: 18/626,910

(22) Filed: Apr. 4, 2024

(65) Prior Publication Data
US 2025/0042466 A1    Feb. 6, 2025

(30) Foreign Application Priority Data
Aug. 2, 2023    (KR) ........................ 10-2023-0101093

(51) Int. Cl.
*B62D 5/04*        (2006.01)
*B62D 6/00*        (2006.01)
(52) U.S. Cl.
CPC ............. *B62D 5/046* (2013.01); *B62D 6/002* (2013.01)
(58) Field of Classification Search
CPC ......... G05B 11/42; B62D 6/002; B62D 5/046
See application file for complete search history.

(56) References Cited

U.S. PATENT DOCUMENTS

| | | | |
|---|---|---|---|
| 2020/0023893 A1* | 1/2020 | Naik | B62D 5/0466 |
| 2021/0061348 A1* | 3/2021 | Araki | B62D 61/08 |
| 2021/0300464 A1 | 9/2021 | Kodera et al. | |
| 2022/0009547 A1 | 1/2022 | Osajima et al. | |
| 2022/0009549 A1* | 1/2022 | Kim | G01B 21/22 |

FOREIGN PATENT DOCUMENTS

KR    10-2018-0065045 A    6/2018

OTHER PUBLICATIONS

Extended European Search Report issued on Jul. 10, 2024 in the corresponding European Patent Application No. 24151284.7.
Ogata Katsuhiko: "Fifth Edition", Aug. 25, 2009 (Aug. 25, 2009), pp. 590-591, XP093173845, ISBN: 978-0-13-615673-4.

* cited by examiner

*Primary Examiner* — Logan M Kraft
*Assistant Examiner* — Joshua Campbell
(74) *Attorney, Agent, or Firm* — Morgan, Lewis & Bockius LLP

(57)        ABSTRACT

Provided is an apparatus for controlling a road wheel actuator (RWA) system, the apparatus including a sensor module configured to detect sensing data of at least one of a steering angle, rack position information, angular velocity of a steering wheel, and column torque, and a processor configured to perform a Proportional Integral Differential (PID) control logic based on the sensing data detected by the sensor module and the RWA position information fed back from the RWA system.

8 Claims, 6 Drawing Sheets

FIG.3

RWA SYSTEM CONTROL APPARATUS AND METHOD

CROSS-REFERENCE TO RELATED APPLICATION

This application claims priority from and the benefit of Korean Patent Application No. 10-2023-0101093, filed on Aug. 2, 2023, which is hereby incorporated by reference for all purposes as if set forth herein.

BACKGROUND

Field

Exemplary embodiments of the present disclosure relate to an apparatus and method for controlling a road wheel actuator (RWA) system, and more specifically, to an apparatus and method for controlling a road wheel actuator (RWA) system to improve the responsiveness and noise vibration harshness (NVH) performance required by a steer-by-wire (SBW) steering system through RWA system control.

Discussion of the Background

Generally, in vehicle steering apparatuses (or steering systems), power steering systems have been developed and applied to provide convenience in driving operations by assisting the driver's steering wheel maneuverability, wherein such power steering systems have been developed and applied as hydraulic systems using hydraulic pressure, electro-hydraulic systems using both hydraulic pressure and electric power of a motor, and electric systems using only electric power of a motor.

Recently, a steer-by-wire (SBW)-type steering system (or steer-by-wire steering system) has been developed and applied to steer a vehicle using an electric power source such as a motor, instead of removing a mechanical connection between a steering wheel and wheels (i.e., vehicle's driving wheels), such as a steering column, a universal joint, or a pinion shaft.

Such a steer-by-wire steering system is a steering system in which a mechanical connection between the steering wheel and a front wheel steering system (i.e., a rack to which driving wheels are connected) is disconnected, wherein the steering system is configured to receive a rotation signal of the steering wheel from an electronic control unit (ECU) through a communication line (e.g., Direct CAN, DCAN) and activate a steering motor connected to the rack in response to the input rotation signal of the steering wheel to steer a vehicle.

In recent years, vehicles have been applied with parking assistance systems (PA), transmitting a position control signal (i.e., steering position control signal) to the steering system to control the position (i.e., steering position) of the vehicle wheels, thereby enabling automatic parking.

In order for the parking assistance system (PA) to operate normally, the steering system performs position feedback control to follow a steering angle control command, wherein the steering system normally performs reaction force control, but when a position control activation signal is received, the steering system switches to a position control mode and follows the position command. More specifically, the position control (i.e., steering position control) uses feedback control, which performs a control action by utilizing the difference between the steering position according to the steering position command and the current steering position.

Meanwhile, the steer by wire (SBW) system includes a steering feedback actuator (SFA) system associated with a steering wheel portion and a road wheel actuator (RWA) system associated with a vehicle wheel portion, which are mechanically separated.

The SFA may include a steering wheel, a steering shaft, a reaction force motor, a steering angle sensor, a steering torque sensor, and the like. The driver's steering intention may be input to the SFA via the steering wheel. The control unit (e.g., ECU) may receive information about the driver's steering intention (steering information) from the SFA, and output corresponding control signals to the RWA. The steering information may include a steering angle, a steering torque, etc.

However, since the steering responsiveness required by the steering angle control logic of conventional motor driven power steering (MDPS) is not as fast as the steering responsiveness required by SBW RWA, it is difficult for conventional MDPS steering angle control logic to satisfy fast steering responsiveness and NVH performance at the same time. In other words, the way to increase steering response in conventional P-PI controllers is to increase the position control P gain, which is difficult to apply in real vehicles because the NVH performance of the entire system decreases (e.g., operation noise and tongue noise during sharp reversals).

Therefore, a steering angle control logic is required to satisfy the steering response and NVH criteria required by the SBW RWA.

The background technology of the present disclosure is disclosed in Unexamined Korean Patent Publication No. 10-2018-0065045 (published on Jun. 18, 2018 and entitled 'Steer-By-Wire System Steering Control Method').

SUMMARY

Various embodiments are directed to a road wheel actuator (RWA) system control apparatus and method capable of improving steering responsiveness and noise vibration harshness (NVH) performance required by a steer-by-wire (SBW) steering system through control of the RWA system.

In an aspect of the present disclosure, there is provided an apparatus for controlling a road wheel actuator (RWA) system, the apparatus including: a sensor module configured to detect data of at least one of a steering angle, rack position information, angular velocity of a steering wheel, and column torque; and a processor configured to perform a PID control logic on the basis of the sensing data detected by the sensor module and the RWA position information fed back from the RWA system.

The PID control logic may include a gain D ($D_{cmd}$) for a target position command and a gain D ($D_{fed}$) for the RWA position information fed back from the RWA system.

The PID control logic may include a first adder configured to perform an additive operation on the target position command by the steering wheel and the RWA position information fed back from the RWA system to produce an error value corresponding to the difference therebetween.

The PID control logic may further include a P (Proportional) controller configured to multiply the error value calculated by the first adder by a specified gain P.

The PID control logic may further include an I (Integral) controller configured to integrate the error value calculated by the first adder and multiply the integrated error value by a specified gain I.

The PID control logic may further include a first D (Differential) controller configured to differentiate a value obtained by filtering the target position command using a first low pass filter of a specified frequency (Hz) and multiply the derivative by a specified gain D ($D_{cmd}$).

The PID control logic may further include a second D (Differential) controller configured to differentiate a value obtained by filtering the RWA position fed back from the RWA system using a second low pass filter of a specified frequency (Hz) and multiply the derivative by a specified gain D ($D_{fed}$).

The PID control logic may further include a second adder configured to perform an additive operation on values output from the P.I.D. controller and output a resultant difference value between the output values to the RWA system.

In another aspect of the present disclosure, there is provided a method of controlling a road wheel actuator (RWA) system, the method including: detecting, by a processor, sensing data from a sensor module; and performing, by the processor, a PID control logic on the basis of the sensing data and RWA position information fed back from the RWA system.

In performing the PID control logic, the PID control logic may include a gain D ($D_{cmd}$) for a target position command and a gain D ($D_{fed}$) for the RWA position information fed back from the RWA system.

The present disclosure enables the control of the RWA system to improve the steering responsiveness and NVH performance required by the SBW steering system.

BRIEF DESCRIPTION OF THE DRAWINGS

FIG. 3 is an exemplary diagram illustrating a steering angle control logic that may be performed by a processor of FIG. 2.

DETAILED DESCRIPTION OF THE ILLUSTRATED EMBODIMENTS

Figure 1:
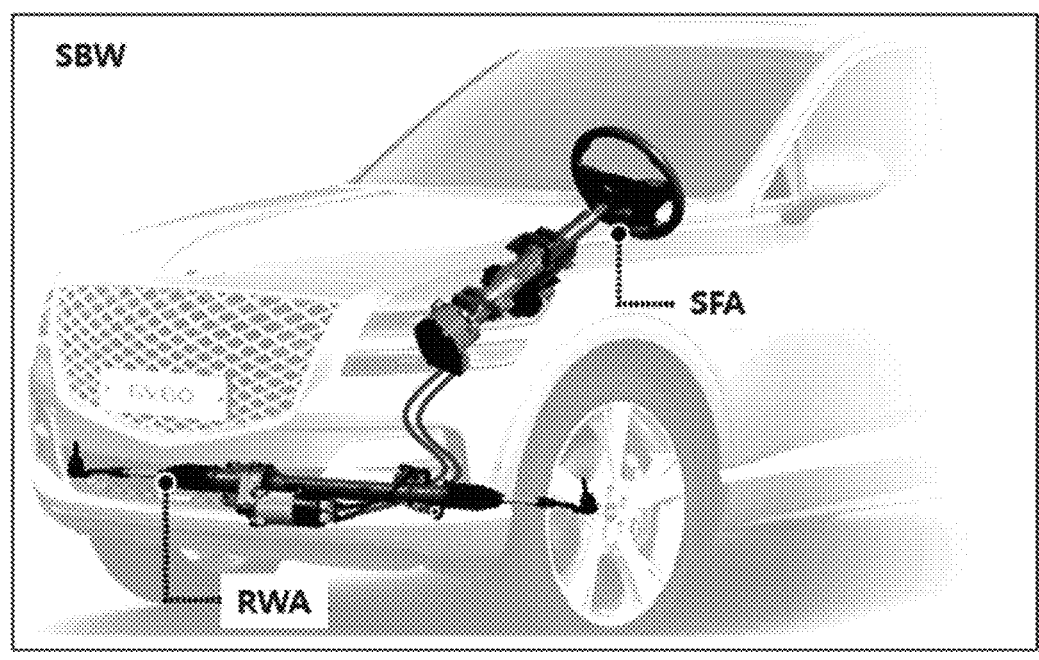
FIG. 1 is an exemplary diagram illustrating a schematic configuration of a steer-by-wire (SBW) system including a steering feedback actuator (SFA) system and a road wheel actuator (RWA) system, according to an embodiment of the present disclosure.

Hereinafter, embodiments of the present disclosure will be described with reference to the accompanying drawings. In the description, the thicknesses of the lines or the sizes of the components illustrated in the drawings may be exaggerated for clarity and convenience of explanation. In addition, the terms to be described later are terms defined in consideration of functions in the present disclosure, which may vary depending on the intention of a user or an operator, or a usual practice in the art. Therefore, definitions of these terms should be made based on the entire contents of this specification.

Embodiments of the present disclosure are described in detail below with reference to the accompanying drawings such that one of ordinary skill in the art to which the present disclosure belongs can easily implement the embodiments. However, the present disclosure may be implemented in many different forms and is not limited to the embodiments described herein. In order to clearly illustrate the present disclosure in the drawings, parts not pertinent to the description have been omitted, and like parts throughout the specification have been designated by like reference numerals.

Throughout the specification, whenever any part "includes" any component, it is meant to be inclusive of other components, not exclusive of other components, unless specifically noted to the contrary.

The implementations described herein may be implemented as, for example, methods or processes, devices, software programs, data streams, or signals. Although discussed only in the context of a single form of implementation (e.g., as a method only), implementations of the features discussed may also be implemented in other forms (e.g., as a device or program). Devices may be implemented with suitable hardware, software, firmware, and the like. Methods may be implemented in devices such as processors, which generally refer to processing devices including computers, microprocessors, integrated circuits, or programmable logic devices, and the like.

As already described above, the conventional motor driven power steering (MDPS) steering angle control logic has the form of a P-PI controller, and the steering angle command for the conventional MDPS steering angle control is received via C-CAN, and since the command reception period is 10 to 20 ms or more, the required responsiveness is 30 ms or more, so that the requirement could be satisfied with the P-PI controller tuning factor.

However, since a steer-by-wire (SBW) system is a next-generation steering device that replaces MDPS, it is necessary to secure the steering responsiveness and NVH performance equivalent to or higher than those of MDPS, but it is difficult to satisfy the performances with the P-PI controller tuning factors ($P_p$, $P_{pi}$, $I_{pi}$: position controller gain P, speed controller gain P,I) of the existing MDPS steering angle control logic.

This is because, in conventional P-PI controllers, the way to increase the responsiveness is to increase the position control gain P, but in doing so, the overall NVH performance of the system decreases (e.g., operation noise and tongue noise during sharp reversals), which is difficult to apply to actual vehicles.

Accordingly, the present disclosure provides a technique for performing steering angle control to satisfy the responsiveness and NVH criteria required by the SBW RWA.

Figure 2:
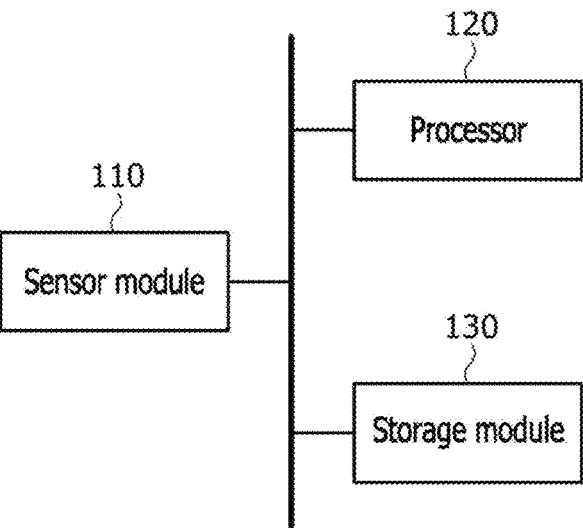
FIG. 2 is an exemplary diagram illustrating a schematic configuration of a control apparatus of the RWA system of FIG. 1.
Figure 3:
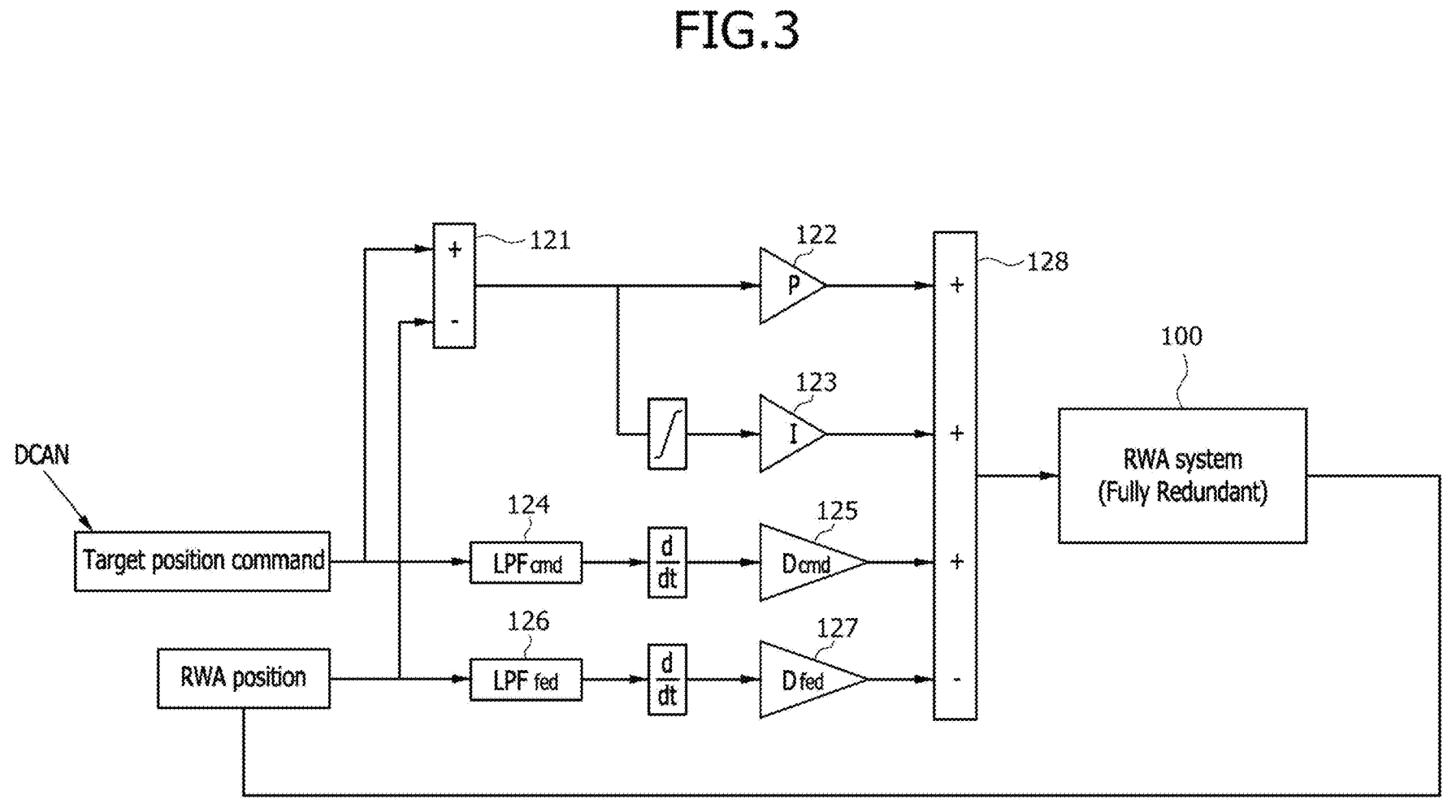

FIG. 1 is an exemplary diagram illustrating a schematic configuration of a steer-by-wire (SBW) system including a steering feedback actuator (SFA) system and a road wheel actuator (RWA) system, according to an embodiment of the present disclosure. FIG. 2 is an exemplary diagram illustrating a schematic configuration of a control apparatus of the RWA system of FIG. 1. FIG. 3 is an exemplary diagram illustrating a steering angle control logic that may be performed by a processor of FIG. 2.

Referring to FIG. 2, the control apparatus of an RWA system according to an embodiment of the present disclosure includes a sensor module 110, a processor 120, and a storage module 130.

The sensor module 110 may detect sensing data such as a steering angle of the steering wheel, rack position information, angular velocity of the steering wheel, and column torque. Here, the rack position information may include a rack position, an angle of the rack position, and the like.

The sensor module 110 may include a steering angle sensor to detect a change in rotation of the steering column that varies according to the driver's steering wheel operation, a torque sensor mounted on one side of a reaction force motor and the steering column to detect steering torque applied to the steering column or reaction force torque output from the reaction force motor, a motor encoder sensor to detect an angular velocity (rpm) of the steering wheel, a rack position sensor located on a rack bar to detect rack position information, a motor torque sensor to detect torque of a driving motor, and the like. The sensor module 110 may be referred to as a sensor.

The processor 120 may control the alignment of the steering wheel and the rack position on the basis of the sensing data from the sensor module 110. The processor 120 according to an exemplary embodiment of the present disclosure may be a hardware device implemented by various electronic circuits (e.g., computer, microprocessor, CPU, ASIC, circuitry, logic circuits, etc.). The processor 120 may be implemented by a non-transitory memory storing, e.g., a program(s), software instructions reproducing algorithms, etc., which, when executed, performs various functions described hereinafter, and a processor configured to execute the program(s), software instructions reproducing algorithms, etc. Herein, the memory and the processor 120 may be implemented as separate semiconductor circuits. Alternatively, the memory and the processor 120 may be implemented as a single integrated semiconductor circuit. The processor 120 may embody one or more processor(s).

The processor 120 may perform PID control to improve steering angle control response performance and NVH performance (see FIG. 3).

Referring to FIG. 3, an embodiment may include a plurality of D-gains to control the system responsiveness compared to a conventional P-PI controller.

For example, the embodiment may include a gain D (D$_{cmd}$) for the target position command and a gain D (D$_{fed}$) for the RWA position information fed back from the RWA system 100 to improve the system responsiveness.

The reason why a conventional PID formula is not used in this embodiment is because if the error derivative is used directly for the gain D, as in the conventional PID formula, poor NVH performance and vibration may occur easily. This is because the steering angle according to the command is received through CAN communication, so the resolution is bound to be low, and when the corresponding signal is differentiated, noise is generated, which reduces NVH performance.

Therefore, since the differential value of the target position command (i.e., the command angle) is very helpful in improving the response performance, the present embodiment uses the following PID formula to tune and modify the target position command (i.e., command angle) and the RWA position (i.e., feedback angle) fed back from the RWA system 100 by differentiating values obtained by filtering the target position command and the RWA position using low pass filters of different specified frequencies (Hz) and multiplying the derivatives by specified gains (D$_{cmd}$, D$_{fed}$) (see FIG. 3).

The following PID formulas are provided by reference for aiding in understanding the PID control logic of the present disclosure.

$$\theta_{cmd} - \theta_{fed} = \theta_{err}$$

$$PID_{basic} = \theta_{err} \cdot P + \frac{1}{s} \cdot \theta_{err} \cdot I + LPF(s \cdot \theta_{err}) \cdot D$$

$$PWD_{RWA} =$$

$$\theta_{err} \cdot P + \frac{1}{s} \cdot \theta_{err} \cdot I + LPF_{cmd}(s \cdot \theta_{cmd}) \cdot D_{cmd} - LPF_{fed}(s \cdot \theta_{fed}) \cdot D_{fed} =$$

$$\underbrace{(\theta_{cmd} - \theta_{fed}) \cdot P + LPF_{cmd}(\omega_{cmd}) \cdot D_{cmd}}_{\substack{System \\ Responsiveness}} -$$

$$\underbrace{LPF_{fed}(\omega_{fed}) \cdot D_{fed}}_{System\ Stability\ (Damping)} + \underbrace{\int (\theta_{cmd} - \theta_{fed}) \cdot I}_{Steady-state\ Error}$$

Θ: Angle (steering angle),
s: Derivative,
1/s: Integral,
PID$_{basic}$: Formula for conventional, generic PID control logic,
PID$_{RWA}$: Formula of PID control logic according to an embodiment of the present disclosure,
ω: Angular velocity.

The storage module 130 is configured to store data related to the operation of the RWA system. In particular, the storage module 130 may store logic (or algorithms, applications, programs, or applets, etc.) for performing PID control for improving steering angle control responsiveness and NVH performances.

The storage module 130 may collectively refer to a non-volatile storage device that retains stored information even when not powered, and a volatile storage device that requires power to retain stored information. The storage module 130 may also function to temporarily or permanently store data processed by the processor 120. Here, the storage module 130 may include magnetic storage media or flash storage media in addition to volatile storage devices that require power to maintain stored information, but the scope of the present disclosure is not limited thereto.

Hereinafter, the operation of the processor 120 will be described in detail.

As illustrated in FIG. 3, the PID control logic according to the present embodiment includes a first adder 121 that performs an additive operation on the target position command by the steering wheel (not shown) and the RWA position information fed back from the RWA system 100 to produce an error value corresponding to the difference therebetween, a P (Proportional) controller 122 that multiplies the error value calculated by the first adder 121 by a specified gain P, and an I (Integral) controller 123 that integrates the error value calculated by the adder 121 and multiplies the integral by a specified gain I, a first D (Differential) controller 125 that differentiates a value obtained by filtering the target position command (i.e., command angle) using a first low pass filter 124 of a specified frequency (Hz) and multiplies the derivative by a specified gain D (D$_{cmd}$), a second D (Differential) controller 127 that differentiates a value obtained by filtering the RWA position (i.e., feedback angle) fed back from the RWA system 100 using a second low pass filter 126 of a specified frequency (Hz) and multiplies the derivative by a specified gain D (D$_{fed}$), and a second adder 128 that performs an additive operation on the values output by the I,D controllers 122, 123, 125, 127 and outputs the difference value between output values to the RWA system 100.

As described above, the present embodiment may include first and second D controllers 125, 127 that include a gain D ($D_{cmd}$) for the target position command and a gain D ($D_{fed}$) for the RWA position information fed back from the RWA system 100 to improve the system responsiveness.

Figure 4A:
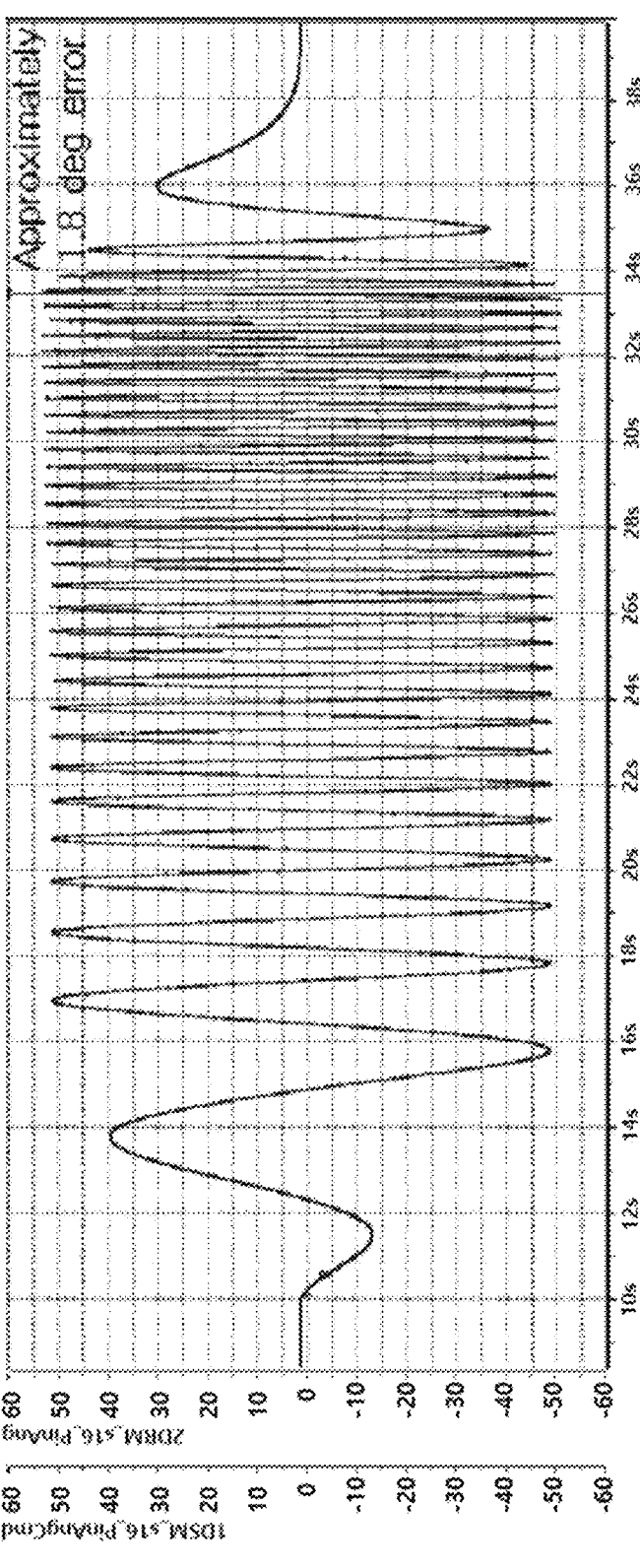
FIGS. 4 and 5 are graphs showing the results of a hardware in the loop simulation (HILS) steering responsiveness evaluation of the control apparatus of the RWA system according to an embodiment of the present disclosure.
Figure 4B:
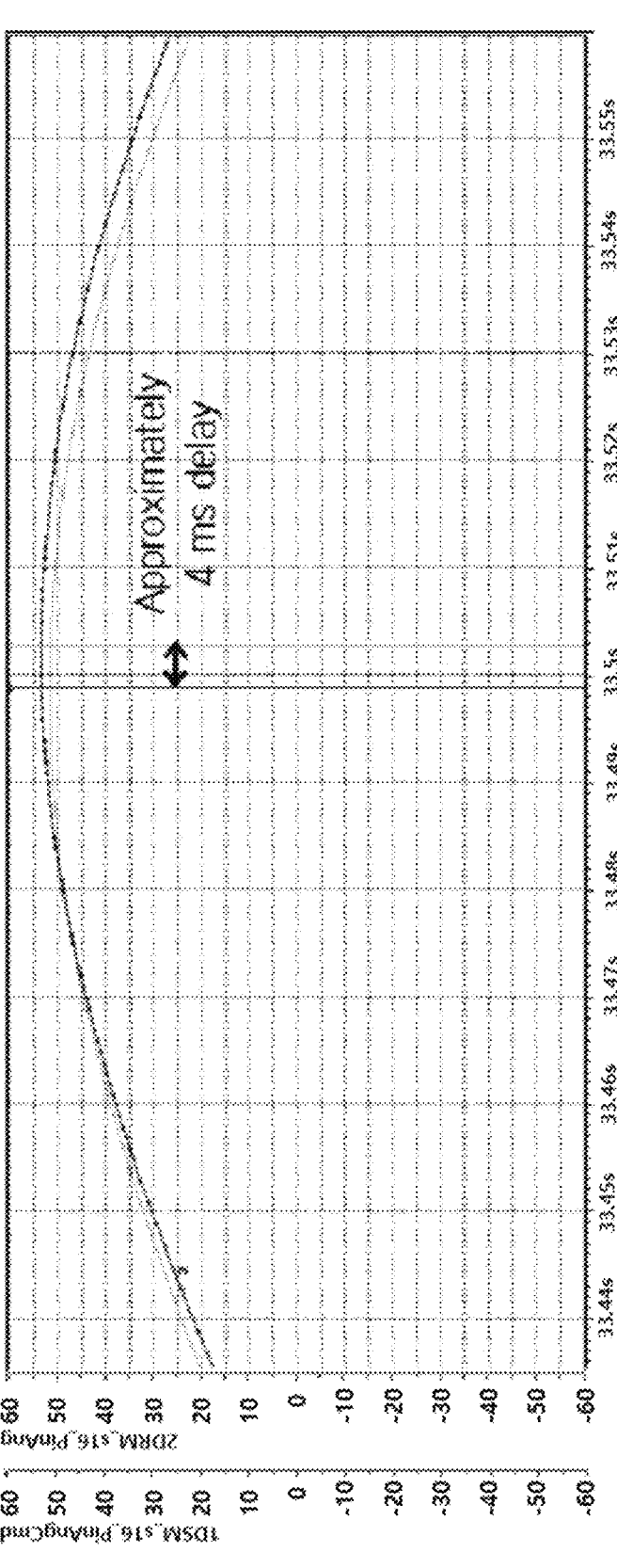
Figure 5:
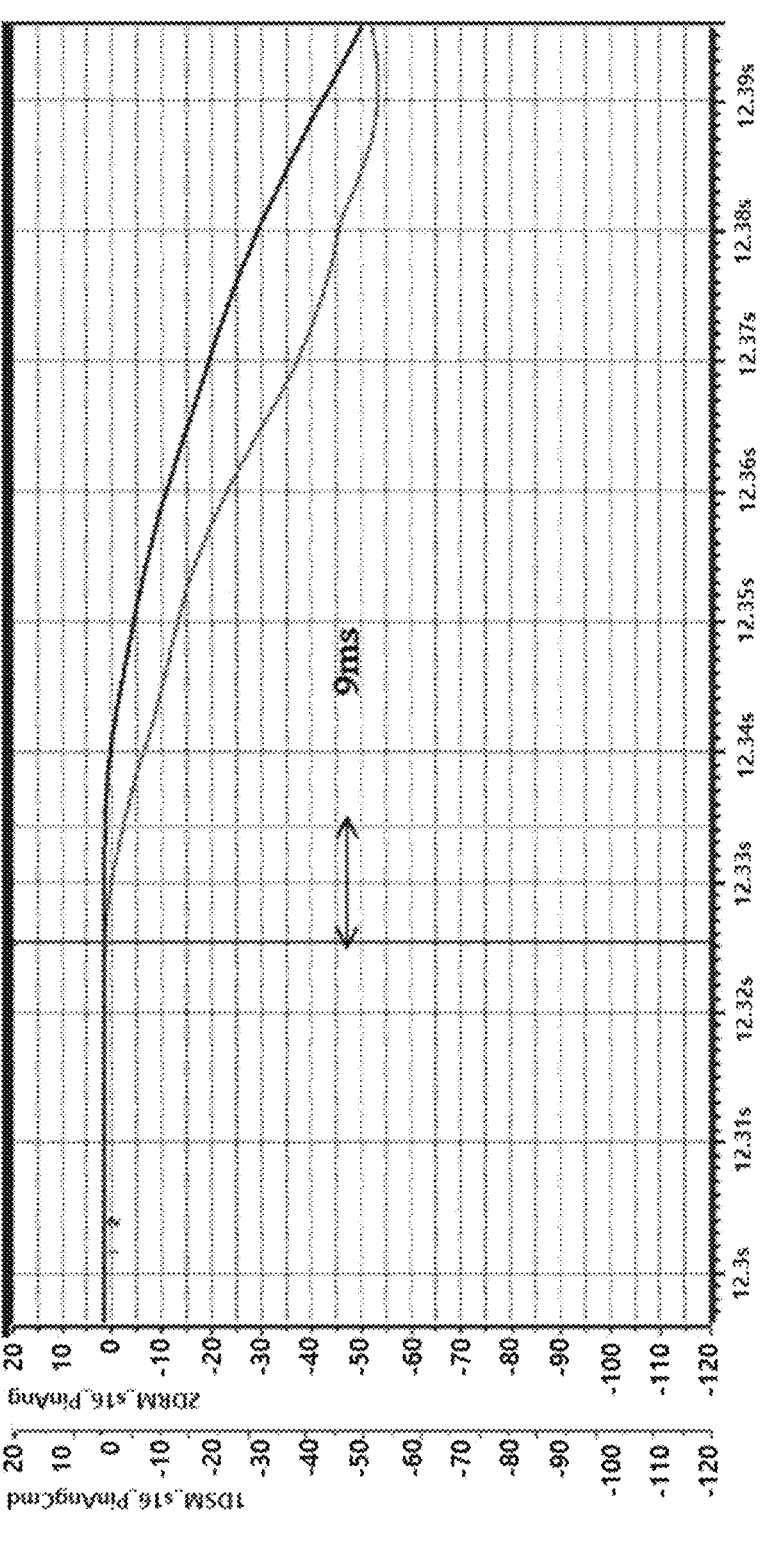

FIGS. 4 and 5 are graphs showing the results of a hardware in the loop simulation (HILS) steering responsiveness evaluation of the control apparatus of the RWA system according to an embodiment of the present disclosure, which show improved angular error and responsiveness compared to using conventional P-PI control logic or conventional PID control logic. In other words, referring to FIG. 4, it can be seen that when the steering wheel is rotated left and right (Sine Sweep 50 deg up to 4rps), the error degree (in FIG. 4A) and delay degree (in FIG. 4B) are reduced compared to the conventional control logic, and the delay time is also reduced.

Also, as illustrated in FIG. 5, it can be seen that the delay time when the steering wheel is rotated sharply (Step Input 45 deg 900 deg/s) to make a sharp turn or avoid an obstacle is also reduced.

As described above, while the conventional P-PI controller or the conventional PID controller may increase responsiveness by using only gain P, the present embodiment may increase responsiveness by using the gain D ($D_{cmd}$) for the target position command, may improve the NVH performance during sharp reversal steering since the gain D ($D_{cmd}$) for the target position command improves the transient response, and may reduce the gain P compared to the conventional PID controller, thereby providing the effect of improving the overall NVH performance, since the steering responsiveness is improved by using the gain D ($D_{cmd}$) for the target position command.

While the present disclosure has been described with reference to the embodiments illustrated in the drawings, these embodiments are exemplary only, and one of ordinary skill in the art will understand that various modifications and other equivalent embodiments are possible therefrom. Accordingly, the scope of technical protection of the present disclosure is to be defined by the following claims.

What is claimed is:

1. An apparatus for controlling a road wheel actuator (RWA) system, the apparatus comprising:
   a sensor configured to detect sensing data of at least one of a steering angle, rack position information, angular velocity of a steering wheel, and column torque; and
   a processor configured to perform a Proportional Integral Differential (PID) control logic based on the sensing data detected by the sensor and RWA position information fed back from the RWA system; and
   control alignment of the steering wheel of a vehicle and rack position based on the PID control logic,
   wherein the PID control logic comprises a gain D (Dcmd) for a target position command and a gain D (Dfed) for the RWA position information fed back from the RWA system, wherein the Dcmd and the Dfed gains are independently adjustable and are applied within the PID control logic.

2. The apparatus of claim 1, wherein the PID control logic comprises a first adder configured to perform additive operation on the target position command by the steering wheel and the RWA position information fed back from the RWA system to produce an error value corresponding to a difference therebetween.

3. The apparatus of claim 2, wherein the PID control logic further comprises a Proportional controller (P controller) configured to multiply the error value calculated by the first adder by a specified gain P.

4. The apparatus of claim 2, wherein the PID control logic further comprises an Integral controller (I controller) configured to integrate the error value calculated by the first adder and multiply the integrated error value by a specified gain I.

5. The apparatus of claim 2, wherein the PID control logic further comprises a first Differential controller (D controller) configured to differentiate a value obtained by filtering the target position command using a first low pass filter of a specified frequency (Hz) and multiply a derivative by a specified gain D (Dcmd).

6. The apparatus of claim 2, wherein the PID control logic further comprises a second Differential controller (D controller) configured to differentiate a value obtained by filtering the RWA position information fed back from the RWA system using a second low pass filter of a specified frequency (Hz) and multiply a derivative by a specified gain D (Dfed).

7. The apparatus of claim 2, wherein the PID control logic further comprises a second adder configured to perform an additive operation on values output from Proportional (P) controller, Integral (I) controller, first and second Differential (D) controllers in the PID control logic and output a difference value between the output values to the RWA system.

8. A method of controlling a road wheel actuator (RWA) system, the method comprising:
   detecting, by a processor, sensing data from a sensor; and
   performing, by the processor, a Proportional Integral Differential (PID) control logic based on the sensing data and RWA position information fed back from the RWA system; and
   controlling alignment of a steering wheel of a vehicle and rack position based on the PID control logic,
   wherein the PID control logic comprises a gain D (Dcmd) for a target position command and a gain D (Dfed) for the RWA position information fed back from the RWA system, wherein the Dcmd and the Dfed gains are independently adjustable and are applied within the PID control logic.

\* \* \* \* \*